US011961388B2

(12) United States Patent
Hagström et al.

(10) Patent No.: US 11,961,388 B2
(45) Date of Patent: Apr. 16, 2024

(54) VEHICLE ALARM SYSTEM, METHOD AND COMPUTER PROGRAM PRODUCT FOR AVOIDING FALSE ALARMS WHILE MAINTAINING THE VEHICLE ALARM SYSTEM ARMED

(71) Applicant: Ningbo Geely Automobile Research & Development Co., Ltd., Ningbo (CN)

(72) Inventors: Albin Hagström, Lödöse (SE); Johnny Tran Nguyen, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 0 days.

(21) Appl. No.: 17/744,697

(22) Filed: May 15, 2022

(65) Prior Publication Data

US 2022/0277644 A1 Sep. 1, 2022

Related U.S. Application Data

(63) Continuation of application No. PCT/CN2020/128394, filed on Nov. 12, 2020.

(30) Foreign Application Priority Data

Nov. 28, 2019 (EP) .................................... 19212115

(51) Int. Cl.
*G08B 29/18* (2006.01)
*G08B 13/196* (2006.01)

(52) U.S. Cl.
CPC ..... *G08B 29/185* (2013.01); *G08B 13/19647* (2013.01)

(58) Field of Classification Search
None
See application file for complete search history.

(56) References Cited

U.S. PATENT DOCUMENTS 9,845,050 B1 * 12/2017 Garza ................ G08B 21/0205
10,115,029 B1 * 10/2018 Day ....................... G06V 20/59
(Continued)

FOREIGN PATENT DOCUMENTS

CN 1640734 A 7/2005
CN 106494351 A 3/2017
(Continued)

OTHER PUBLICATIONS

International Search Report from corresponding International Application No. PCT/CN2020/128394, dated Jan. 28, 2021, 2 pages.
(Continued)

*Primary Examiner* — Muhammad Adnan
(74) *Attorney, Agent, or Firm* — Tucker Ellis LLP

(57) ABSTRACT

A vehicle alarm system configured to avoid false alarms while maintaining the vehicle alarm system armed. The vehicle alarm system includes: at least a first sensor configured to detect at least a first living object; a processing circuitry operatively connected to the least a first sensor configured to cause the vehicle alarm system to: detect at least a first living object inside of a vehicle by the at least first sensor; and reduce, or unarm, at least a first alarm function of the vehicle alarm system in response to detecting the at least first living object, while at least a second alarm function of the vehicle alarm system is configured to be armed.

9 Claims, 2 Drawing Sheets

(56) References Cited

U.S. PATENT DOCUMENTS

| | | | | |
|---|---|---|---|---|
| 10,239,491 | B1 * | 3/2019 | Crider | B60R 25/31 |
| 11,217,083 | B1 * | 1/2022 | Luo | G06N 3/08 |
| 11,267,436 | B2 * | 3/2022 | Jo | B60R 22/48 |
| 2003/0098784 | A1 * | 5/2003 | Van Bosch | G08B 21/24 340/539.18 |
| 2003/0102688 | A1 * | 6/2003 | Bingle | G08B 21/22 296/76 |
| 2007/0025597 | A1 * | 2/2007 | Breed | B60N 2/002 382/104 |
| 2008/0157964 | A1 | 7/2008 | Eskildsen | |
| 2009/0212943 | A1 | 8/2009 | Burnard | |
| 2015/0319608 | A1 * | 11/2015 | Varughese | H04W 48/04 455/456.4 |
| 2017/0313248 | A1 * | 11/2017 | Kothari | B60R 11/0235 |
| 2018/0196423 | A1 * | 7/2018 | Nordbruch | H04N 7/185 |
| 2018/0357494 | A1 * | 12/2018 | Herbst | G06V 20/597 |
| 2019/0027011 | A1 * | 1/2019 | Gordon | B60N 2/286 |
| 2019/0143944 | A1 * | 5/2019 | Park | G01S 13/878 340/426.24 |
| 2019/0294894 | A1 * | 9/2019 | Fox | G08B 13/19647 |
| 2021/0034059 | A1 * | 2/2021 | Nagata | B60W 60/0015 |
| 2022/0227259 | A1 * | 7/2022 | Sajovic | G08B 21/0255 |
| 2022/0396208 | A1 * | 12/2022 | Kaminski | G06V 20/59 |

FOREIGN PATENT DOCUMENTS

| | | | | |
|---|---|---|---|---|
| CN | 107792011 | A | 3/2018 | |
| CN | 110466428 | A | 11/2019 | |
| DE | 102005001689 | A1 | 8/2005 | |
| DE | 102017222884 | A1 | 6/2019 | |
| GB | 2548780 | A | 10/2017 | |
| JP | H1067302 | A * | 8/1996 | B60Q 1/52 |
| JP | 2013100676 | A | 5/2013 | |

OTHER PUBLICATIONS

Volvo, “Alarm,” Volvo XC90 User Manual for 2018 Model Year, Jul. 23, 2018, pages.

* cited by examiner

VEHICLE ALARM SYSTEM, METHOD AND COMPUTER PROGRAM PRODUCT FOR AVOIDING FALSE ALARMS WHILE MAINTAINING THE VEHICLE ALARM SYSTEM ARMED

RELATED APPLICATION DATA

This application is a continuation of International Patent Application No. PCT/CN2020/128394, filed Nov. 12, 2020, which claims the benefit of European Patent Application No. 19212115.0, filed Nov. 28, 2019, the disclosures of which are incorporated herein by reference in their entireties.

TECHNICAL FIELD

The present disclosure relates to a vehicle alarm system, a method and computer program product for the vehicle alarm system.

BACKGROUND

Vehicles today are often equipped with a vehicle alarm system. One purpose with the vehicle alarm system is to detect when an unwanted person, such as an intruder or a thief, is trying to e.g. break into the vehicle, damage, or tries to steal the vehicle or something that is left inside of the vehicle. Today there are vehicles that automatically arm the vehicle alarm system when the vehicle occupant locks the vehicle. In one example a wireless key is used for locking the vehicle. At the same time when the vehicle occupant is locking the vehicle with the wireless key, the vehicle alarm system is armed.

Vehicle alarm systems today are often armed to detect e.g. if a door is opened, if the vehicle is tilted or if someone is breaking one of the vehicle windows. Vehicle alarm systems are using alarm sensors of different kinds. It is common to use a sensor that is configured to detect if a door, a latch or a hood is opened. There are sensors that are configured to detect if a window breaks. There are sometimes occasions when a vehicle occupant wants to have the vehicle alarm system armed, but cannot arm the system due to that there is a risk that e.g. a door is opened by someone that is not an intruder or thief, e.g. such as a child that is left inside of the vehicle that opens the door. Another example is when a pet is left inside of the vehicle, e.g. a dog that moves so that an alarm sensor detects a tilt or movement of the vehicle, which causes the vehicle alarm system to go off and issue an alarm.

SUMMARY

There are vehicles today with vehicle alarm systems that are configured so that a vehicle occupant can manually disarm the alarm sensor that detects tilting and movements of the vehicle while keeping the alarm sensors that detect an open door armed. A vehicle occupant can turn off the alarm sensor that detects tilting and movements by pressing a switch inside of the vehicle before the vehicle occupant is stepping out of the vehicle. This feature is useful if e.g. a passenger is left inside of the vehicle in order to prevent that the vehicle alarm system to go off and issue an alarm when the passenger moves around inside of the vehicle, makes the vehicle to tilt or move. This solution requires that the vehicle occupant must decide if the alarm sensor that detects tilting and movements of the vehicle should be disarmed or not.

A problem with the solutions of the prior art vehicle alarm systems is that the vehicle alarm system can still go off e.g.

if the passenger that is left inside of the vehicle opens a door. Another problem is that it is not always the case that the vehicle occupant remembers to turn off the alarm sensor that detects tilting and movements of the vehicle, or even knows that this feature exists, and a false alarm is often the result. Another problem is that vehicle occupants want to feel the comfort that the alarm is armed while e.g. leaving the vehicle for a short moment while e.g. a kid and a dog is waiting in the back seat. Leaving the vehicle unlocked in this case makes it possible for an intruder to break into the front seat, or e.g. the trunk, and steal the vehicle or steal something left inside of the vehicle, if the vehicle is not alarmed.

There is thus a need for an improved vehicle alarm system for avoiding false alarms while maintaining the vehicle alarm system armed.

It is an object of the present disclosure to mitigate, alleviate or eliminate one or more of the above-identified deficiencies and disadvantages in the prior art and solve at least the above mentioned problem.

According to a first aspect there is provided a vehicle alarm system configured to avoid false alarms while maintaining the vehicle alarm system armed, the vehicle alarm system comprises: at least a first sensor configured to detect at least a first living object; a processing circuitry operatively connected to the least a first sensor configured to cause the vehicle alarm system to: detect at least a first living object inside of a vehicle by the at least first sensor; and reduce, or unarm, at least a first alarm function of the vehicle alarm system in response to detecting the at least first living object, while at least a second alarm function of the vehicle alarm system is configured to be armed.

An advantage is hence that a vehicle occupant can lock and arm the vehicle, and the vehicle alarm system will automatically detect if a living object is left inside of the vehicle and then reduce or unarm one alarm function while maintaining another alarm function armed.

According to some embodiments, the processing circuitry is further configured to cause the vehicle alarm system to: determine a first location inside of the vehicle associated with the location where the at least first living object is detected; and reduce, or unarm, the at least first alarm function of the vehicle alarm system dependent on the first location in response to detecting the at least first living object, while at least a second alarm function of the vehicle alarm system is configured to be armed at a location other than the determined first location inside of the vehicle.

An advantage with detecting the location of the living object is that an alarm function can be reduced or unarmed in the area of the location where the living object is detected while maintaining another alarm function armed.

According to some embodiments, the at least first sensor is a camera sensor configured to obtain images and identify objects in the obtained images using object recognition for detecting the at least first living object.

An advantage with identifying objects in obtained images is that the living object is visually detected. Another advantage is the living object can be categorized based on object recognition.

According to some embodiments, the at least first sensor is configured to determine the first location of the at least a first living object based on a proximity to at least a first interior object of the vehicle using object recognition for detecting the at least first living object and the at least first interior object of the vehicle.

An advantage with using the proximity to at least a first interior object is that, an interior object can be used for defining a location where to reduce or unarm one alarm function while maintaining another alarm function armed.

According to some embodiments, the at least first sensor is configured to determine the first location of the at least a first living object based on at least a first predefined area within a viewfinder.

An advantage with using the viewfinder to determine the location of the living object is that the viewfinder can cover a plurality of areas within the vehicle, and when detecting a living object by the viewfinder it can at the same time be determined where inside of the vehicle the living object is located.

According to some embodiments, the reducing, or turning off, the at least first alarm function of the vehicle alarm system is changed dynamically dependent on a movement of the detected at least first living object from the first location to a second location other than the first location.

An advantage with changing where the vehicle alarm system is armed and where the vehicle alarm system is reduced, or turned off, is that a detected living object can move around inside of the vehicle while continuously maintaining the vehicle armed at locations where the living object is not present.

According to some embodiments, the at least first sensor is associated with at least a first vehicle compartment space of the vehicle, and the processing circuitry is further configured to cause the vehicle alarm system to: detect the at least first living object in the at least first vehicle compartment space by the at least first sensor; and reduce, or unarm, the at least first alarm function of the vehicle alarm system in the at least first vehicle compartment space where the at least first living object is detected in response to detecting the at least first living object, while at least a second alarm function of the vehicle alarm system is configured to be armed at a location other than the at least first vehicle compartment space.

An advantage with associating the at least first sensor with at least a first vehicle compartment space of the vehicle is that in one part of the vehicle, the vehicle alarm system can be armed, while in another part of the vehicle, the vehicle alarm system is reduced, or unarmed, e.g. defined on specific use cases.

According to some embodiments, the at least first vehicle compartment area is defined by a detection coverage area of the at least first sensor.

An advantage with using the coverage area of the at least first sensor is that the at least first sensor can be arranged in the vehicle at a certain location, e.g. when manufacturing the vehicle, or when setting up the vehicle alarm system, so that the sensor cover a certain area of interest in the vehicle.

According to some embodiments, the vehicle alarm system further comprises at least a first alarm sensor configured to detect a breach of the vehicle alarm system when the vehicle alarm system is armed, and wherein the reducing, or turning off, the at least a first alarm function of the vehicle alarm system the vehicle comprises reducing, or turning off, at least a first alarm function of the at least first alarm sensor.

An advantage with an alarm sensor is that the alarm sensor can be used together with the sensor configured to detect at least a first living object for detecting any breach of the vehicle alarm system.

According to some embodiments, the processing circuitry is further configured to cause the vehicle alarm support system to: detect an object entering inside of the vehicle; and generate an alarm in response to detecting the object.

This has the advantage that the at least first sensor, configured to detect at least a first living object inside of a vehicle, can also be configured to detect an object entering inside of the vehicle, i.e. an object that is not a living object detected inside of the vehicle but e.g. a living object or any object entering inside of the vehicle.

According to some embodiments the at least first sensor is configured to detect at least a first living object inside of the vehicle within a predefined time period, and in accordance with a determination that the at least first living object inside of the vehicle is detected after the predefined time period, generate an alarm in response to detecting the object.

This has the advantage that the at least first sensor, configured to detect at least a first living object inside of a vehicle, can also be configured to detect an object inside of the vehicle that was not detected when reducing, or unarming, the at least a first alarm function of the vehicle alarm system, e.g. a living object that was e.g. hidden and not initially detected such as an intruder hiding somewhere in inside of the vehicle.

According to a second aspect there is provided a method at a vehicle alarm system for avoiding false alarms while maintaining the vehicle alarm system armed, the method comprising: detecting at least a first living object inside of a vehicle by at least a first sensor; and reducing, or unarm, at least a first alarm function of the vehicle alarm system in response to detecting the at least first living object, while at least a second alarm function of the vehicle alarm system is configured to be armed.

An advantage is hence that a vehicle occupant can lock and arm the vehicle, or the vehicle alarm system can automatically lock and arm the vehicle, and the vehicle alarm system will automatically detect if a living object is left inside of the vehicle and then reduce or unarm one alarm function while maintaining another alarm function armed.

According to some embodiments, the method further comprises: determining a first location inside of the vehicle associated with the location where the at least first living object is detected; and reducing, or unarming, the at least first alarm function of the vehicle alarm system dependent on the first location in response to detecting the at least first living object, while at least a second alarm function of the vehicle alarm system is configured to be armed at a location other than the determined first location inside of the vehicle.

An advantage with detecting the location of the living object is that an alarm function can be reduced or unarmed in the area of the location where the living object is detected while maintaining another alarm function armed.

According to some embodiments, the method further comprises: detecting the at least first living object in at least a first vehicle compartment space by the at least first sensor; and reducing, or unarming, the at least first alarm function of the vehicle alarm system in the at least first vehicle compartment space where the at least first living object is detected in response to detecting the at least first living object while at least a second alarm function of the vehicle alarm system is configured to be armed at a location other than the at least first vehicle compartment space.

An advantage with associating the at least first sensor with at least a first vehicle compartment space of the vehicle is that in one part of the vehicle, the vehicle alarm system can be armed, while in another part of the vehicle, the vehicle alarm system is reduced, or unarmed, e.g. defined on specific use cases.

According to some embodiments, the method further comprises: detecting an object entering inside of the vehicle; and generating an alarm in response to detecting the object.

This has the advantage that the at least first sensor, configured to detect at least a first living object inside of a vehicle, can also be configured to detect an object entering inside of the vehicle, i.e. an object that is not a living object detected inside of the vehicle but e.g. a living object or any object entering inside of the vehicle.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
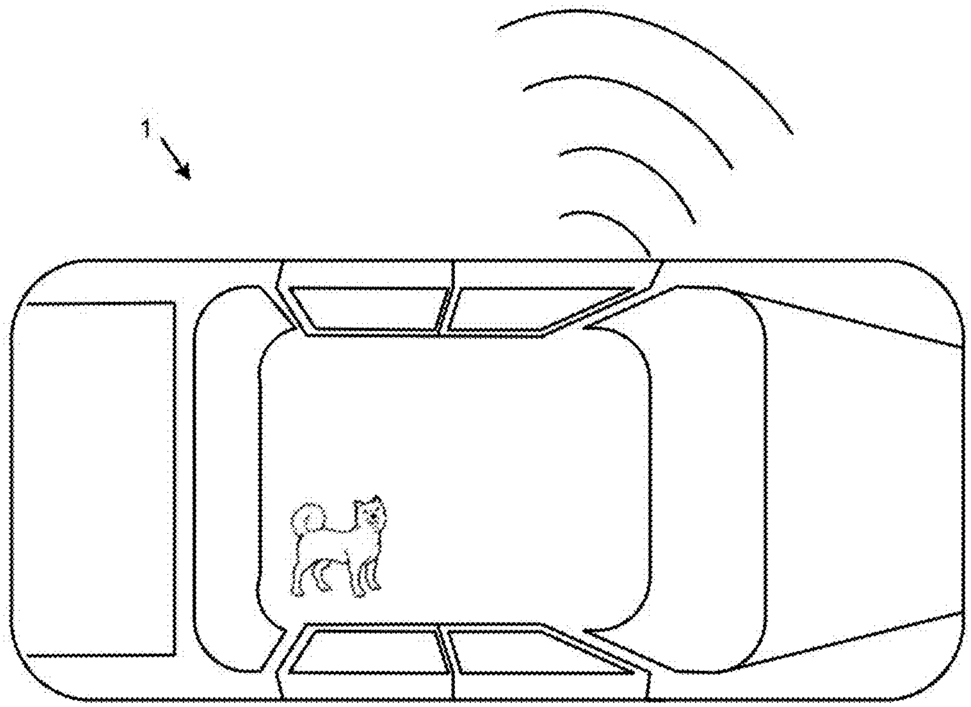
FIG. 1 illustrates a vehicle with a vehicle alarm system according to the prior art.

There are sometimes occasions when a vehicle occupant wants to have the vehicle alarm system armed, but the vehicle occupant cannot arm the system because the high likelihood that a false alarm will be issued. One example is when a pet is left inside of the vehicle, e.g. a dog that moves so that an alarm sensor detects a tilt or movement of the vehicle, which causes the vehicle alarm system to go off and issue an alarm. FIG. 1 illustrates a vehicle with a vehicle alarm system according to the prior art where a false alarm is issued caused by a pet that is moving around inside of the vehicle. Typically, the vehicle alarm system detects a movement by the pet and the movement causes the vehicle alarm system to go off.

There are vehicles today with vehicle alarm systems that are configured so that a vehicle occupant can manually disarm the alarm sensor that detects tilting and movements of the vehicle while keeping the alarm sensors that detect an open door armed. A vehicle occupant can turn off the alarm sensor that detects tilting and movements by pressing a switch inside of the vehicle before the vehicle occupant is stepping out of the vehicle. This feature is useful if e.g. a passenger is left inside of the vehicle in order to prevent that the vehicle alarm system to go off and issue an alarm when the passenger moves around inside of the vehicle, makes the vehicle to tilt or move. This solution requires that the vehicle occupant must decide if the alarm sensor that detects tilting and movements of the vehicle should be disarmed or not.

A problem with the solutions of the prior art vehicle alarm systems is that the vehicle alarm system can still go off e.g. if the passenger that is left inside of the vehicle opens a door. Another problem is that it is not always the case that the driver, which is most often the vehicle occupant that is leaving the vehicle, remembers to turn off the alarm sensor that detects tilting and movements of the vehicle, or even knows that this feature exists, and a false alarm is often the result. Another problem is that vehicle occupants want to feel the comfort that the alarm is armed while e.g. leaving the vehicle for a short moment while e.g. a kid and a dog is waiting in the back seat. Leaving the vehicle unlocked in this case makes it possible for an intruder to break into the front seat, or e.g. the trunk, and steal the vehicle or steal something left inside of the vehicle, if the vehicle is not alarmed at all.

There is thus a need for an improved vehicle alarm system for avoiding false alarms while maintaining the vehicle alarm system armed.

Typically a vehicle alarm system comprises a plurality of alarm functions. It is known from the prior art that one alarm function is to e.g. arm the vehicle alarm system to detect opening of a trunk, another is to arm the vehicle alarm system to detect opening of a door, another is to arm the vehicle alarm system to detect opening of a hood. Further examples include arming the vehicle alarm system to detect tilting and/or movement of the vehicle. A further example is to arm the vehicle alarm system to detect breaking of a window.

Figure 2:
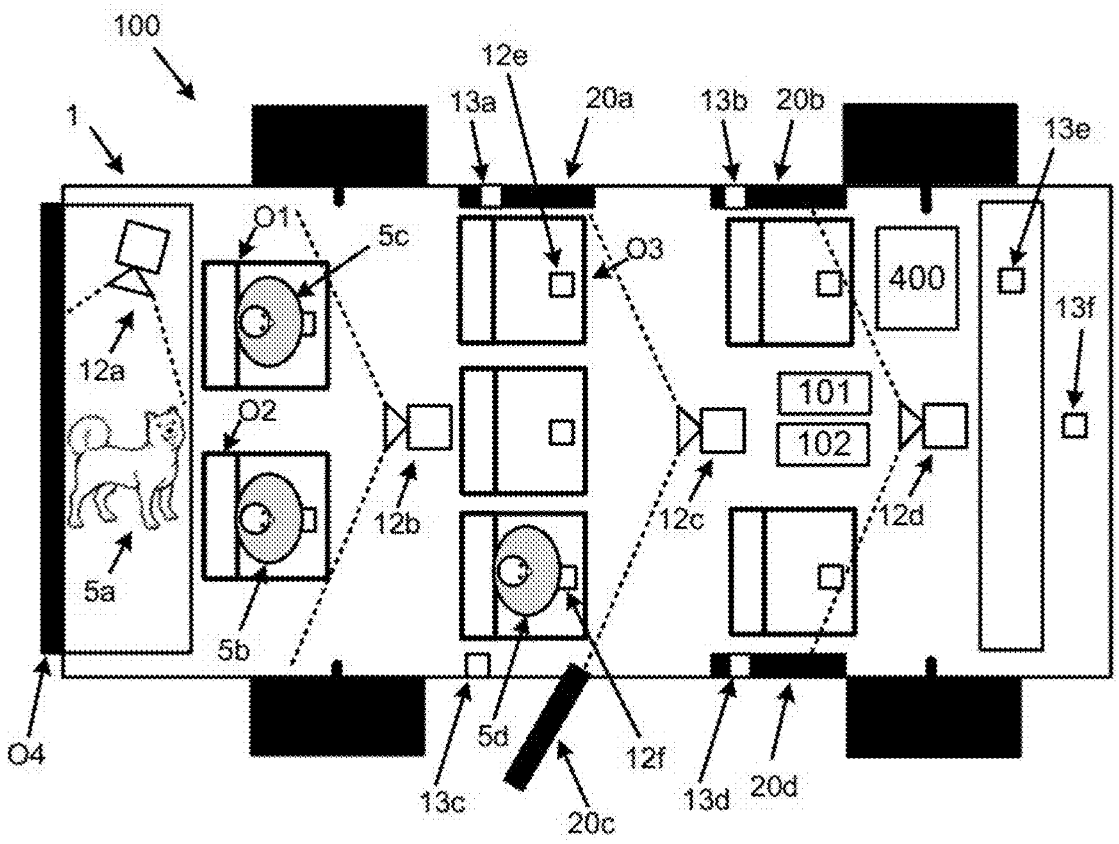
FIG. 2 illustrates the vehicle alarm system according to some embodiments.

The first aspect of this disclosure shows a vehicle alarm system 100, as illustrated in FIG. 2, configured to avoid false alarms while maintaining the vehicle alarm system 100 armed. The vehicle alarm system 100 comprises: at least a first sensor 12*a*, 12*b*, 12*c*, 12*d*, 12*e*, 12*f* configured to detect at least a first living object 5*a*, 5*b*, 5*c*, 5*d*.

According to some embodiments the at least first sensor 12*a*, 12*b*, 12*c*, 12*d*, 12*e*, 12*f* is any of a pressure sensor; a capacitive sensor; a movement sensor such as an accelerometer or a gyro; a weight sensor, that is e.g. detecting a certain weight that is associated with the weight of e.g. a pet, a child or an adult person; an infrared sensor configured to detect a reflected infrared light and determine that an object is at a certain distance from the infra-red sensor; a light sensor, e.g. configured to detect a breach of a light beam; a photo detector; a temperature sensor; sound sensor e.g. configured to detect sound of living objects 5*a*5*b*, 5*c*, 5*d*; a camera configured to obtain images; a heat sensitive camera configured to obtain thermal images for detecting the at least first living object 5*a*, 5*b*, 5*c*, 5*d* by temperature; a sonar configured to detect the at least first living object 5*a*, 5*b*, 5*c*, 5*d* using sound waves; a radar configured to detect the at least first living object 5*a*, 5*b*, 5*c*, 5*d* by radio waves; a radio receiver configured to detect the at least first living object 5*a*, 5*b*, 5*c*, 5*d* by detecting the use of a radio transceiver operating at a certain frequency worn by the at least first living object 5*a*, 5*b*, 5*c*, 5*d*; a piezoelectric element; an electroactive polymer; a switch; a memory metal, or similar. According to some embodiments the at least first sensor 12*a*, 12*b*, 12*c*, 12*d*, 12*e*, 12*f* is an interior view camera configured to obtain at least a first interior view of the vehicle 1.

FIG. 2 illustrates the vehicle alarm system with according to some embodiments. In FIG. 2 the at least first sensors 12*a*, 12*b*, 12*c*, 12*d* are exemplified by cameras configured obtained to obtain images; and the at least first sensors 12*e*, 12*f* are exemplified by pressure sensors in the back seat of the vehicle configured to detect the pressure caused by the at least first living object 5*a*, 5*b*, 5*c*, 5*d* when sitting on the seats.

According to some embodiments the least first living object 5*a*, 5*b*, 5*c*, 5*d* is any of a human or an animal. In one example the least first living object 5*a*, 5*b*, 5*c*, 5*d* is any of a dog, cat, bird, rabbit, snake, rat or any other pet. In one example the least first living object 5*a*, 5*b*, 5*c*, 5*d* is any of a kid, adult or an older person. In one example the least first living object 5*a*, 5*b*, 5*c*, 5*d* is any of a balloon, interior ornament, luggage, or similar object that may cause movement inside of the vehicle.

According to some embodiments the at least first sensor 12*a*, 12*b*, 12*c*, 12*d*, 12*e*, 12*f* is arranged at the vehicle 1 in order to detect at least a first living object 5*a*, 5*b*, 5*c*, 5*d* inside of the vehicle 1. According to an aspect the at least first sensor 12*a*, 12*b*, 12*c*, 12*d*, 12*e*, 12*f* is arranged at the vehicle 1 in order to detect any object inside of the vehicle 1 and determine, out from the detected object, at least a first living object 5*a*, 5*b*, 5*c*, 5*d* inside of the vehicle 1. According to some embodiments the at least first sensor 12*a*, 12*b*, 12*c*, 12*d*, 12*e*, 12*f* is configured to detect at least a first living object 5*a*, 5*b*, 5*c*, 5*d* inside of the vehicle 1 within a predefined time period. According to some embodiments the at least first sensor 12*a*, 12*b*, 12*c*, 12*d*, 12*e*, 12*f* is configured to detect at least a first living object 5*a*, 5*b*, 5*c*, 5*d* inside of the vehicle 1 within a predefined time period after the vehicle has been locked and/or the vehicle alarm system has been armed.

According to some embodiments the at least first sensor 12*a*, 12*b*, 12*c*, 12*d*, 12*e*, 12*f* is configured to detect at least a first living object 5*a*, 5*b*, 5*c*, 5*d* inside of the vehicle 1 within a predefined time period and define the detected at least first living object 5*a*, 5*b*, 5*c*, 5*d* as a friendly living object that should not cause the vehicle alarm system to go off.

The vehicle alarm system 100 further comprises a processing circuitry 102 operatively connected to the least a first sensor 12*a*, 12*b*, 12*c*, 12*d*, 12*e*, 12*f*. According to some embodiments the processing circuitry 102 is the processing circuitry of an on-board vehicle computer. According to some embodiments the vehicle alarm system 100 further comprises a memory 101 configured to store data. According to some embodiments the memory 101 is the memory of an on-board vehicle computer. According to some embodiments the processing circuitry is comprised in an electronic device connected to the vehicle alarm system 100 via a wireless communication network. According to some embodiments the memory is comprised in an electronic device connected to the vehicle alarm system 100 via a wireless communication network.

In one example the wireless communication network is a standardized wireless local area network such as a Wireless Local Area Network, WLAN, Bluetooth™, ZigBee, Ultra-Wideband, Radio Frequency Identification, RFID, or similar network. In one example the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some aspects wireless communication network can also be a combination of both a local area network and a wide area network. According to some embodiments the wireless communication network is defined by common Internet Protocols.

The processing circuitry 102 is configured to cause the vehicle alarm system 100 to: detect at least a first living object 5*a*, 5*b*, 5*c*, 5*d* inside of a vehicle 1 by the at least first sensor 12*a*, 12*b*, 12*c*, 12*d*, 12*e*, 12*f*; and reduce, or unarm, at least a first alarm function of the vehicle alarm system 100 in response to detecting the at least first living object 5*a*, 5*b*, 5*c*, 5*d*, while at least a second alarm function of the vehicle alarm system 100 is configured to be armed.

An advantage is hence that a vehicle occupant can lock and arm the vehicle 1, and the vehicle alarm system 100 will automatically detect if a living object 5*a*, 5*b*, 5*c*, 5*d* is left inside of the vehicle 1 and then reduce or unarm one alarm function while maintaining another alarm function armed. In an example the vehicle occupant can leave the vehicle 1, lock the vehicle 1 and/or arm the vehicle alarm system 100, and with reference to the example as illustrated in FIG. 2, at least a first living object 5*a*, 5*b*, 5*c*, 5*d* is detected inside of the vehicle 1 by the at least first sensor 12*a*, 12*b*, 12*c*, 12*d*, 12*e*, 12*f*, and in the example the alarm function of the trunk of the vehicle 1 is unarmed, and the alarm function in the back seat doors are reduced by unarming the alarm function for opening the right side door of the backseat, and reducing the alarm function for detecting a tilt or movement of the vehicle 1.

Another advantage is that the vehicle occupant does not need to manually turn off e.g. the alarm sensor that detects tilting and movements of the vehicle 1, instead if a living object 5*a*, 5*b*, 5*c*, 5*d* is detected this is an example of an alarm function that could be reduced or unarmed automatically by the vehicle alarm system 100.

According to some embodiments the processing circuitry 102 is further configured to cause the vehicle alarm system 100 to: determine a first location inside of the vehicle 1 associated with the location where the at least first living object 5*a*, 5*b*, 5*c*, 5*d* is detected; and reduce, or unarm, the at least first alarm function of the vehicle alarm system 100 dependent on the first location in response to detecting the at least first living object 5*a*, 5*b*, 5*c*, 5*d*, while at least a second alarm function of the vehicle alarm system 100 is configured to be armed at a location other than the determined first location inside of the vehicle 1.

An advantage with detecting the location of the living object 5*a*, 5*b*, 5*c*, 5*d* is that an alarm function can be reduced or unarmed in the area of the location where the living object 5*a*, 5*b*, 5*c*, 5*d* is detected while maintaining another alarm function armed at another location of the vehicle 1. Another advantage is that a number of alarm functions that are associated with the location can be reduced or unarmed, so that e.g. opening a door at the location where the living object is detected is possible without causing the vehicle alarm system 100 to issue an alarm, while opening a door at another location will cause the vehicle alarm system 100 to issue an alarm.

In an example with reference to the illustration of FIG. 2, a living object in form of a person 5*d* is detected. In the example the alarm function detecting the opening of the door 20*c* is unarmed, while the alarm function detecting the opening of any of the doors 20*a*, 20*b* or 20*d* remains armed.

In a further example, also with reference to the illustration in FIG. 2, a first, a second, a third and a fourth living object are detected inside of the vehicle. The first living object is an adult person 5*d* that is sitting in the back seat on the very right hand seat location, the second living object 5*b* and third living object 5*c* are kids sitting in the second back seat row, in the illustrated vehicle 1, exemplified by a seven seat vehicle, and the fourth living object is a dog 5*a* that is in the trunk of the vehicle 1. In this example the alarm function detecting the opening of the door 20*c* is unarmed, while the alarm function detecting the opening of any of the doors 20*a*, 20*b* or 20*d* remains armed, and the alarm function detecting tilting and movements of the vehicle 1 is unarmed.

According to some embodiments the at least first sensor 12*a*, 12*b*, 12*c*, 12*d*, 12*e*, 12*f* is a camera sensor configured to obtain images and identify objects in the obtained images using object recognition for detecting the at least first living object 5*a*, 5*b*, 5*c*, 5*d*.

An advantage with identifying objects in obtained images is that the living object 5*a*, 5*b*, 5*c*, 5*d* is visually detected. Camera sensors also have the advantage that it is easy to install a camera sensor and a camera sensor can be configured to cover a certain desired area. Another advantage is the living object 5*a*, 5*b*, 5*c*, 5*d* can be categorized based on object recognition. According to some embodiments the object recognition is used for categorizing the at least first living object 5*a*, 5*b*, 5*c*, 5*d*. In an example the at least first living object is categorized as a dog, a cat, a child, an adult, etc. In an example, a living object can be detected and determined as a known living object that has been identified before and categorized as friendly.

According to some embodiments the at least first sensor configured to detect at least a first living object is also configured to function as an alarm sensor. According to some embodiments the camera sensor is also configured to function as an alarm sensor configured to identify unwanted objects in the obtained images.

According to some embodiments the at least first sensor 12*a*, 12*b*, 12*c*, 12*d*, 12*e*, 12*f* is configured to determine the first location of the at least a first living object 5*a*, 5*b*, 5*c*, 5*d* based on a proximity to at least a first interior object O1, O2, O3, O4 of the vehicle 1 using object recognition for detecting the at least first living object 5*a*, 5*b*, 5*c*, 5*d* and the at least first interior object O1, O2, O3, O04 of the vehicle 1.

An advantage with using the proximity to at least a first interior object O1, O2, O3, O4 is that, an interior object can be used for defining a location where to reduce or unarm one alarm function while maintaining another alarm function armed. According to some embodiments, the at least a first interior object O1, O2, O3, O4 is used for defining a location inside of the vehicle 1 where to reduce, or unarm, at least a first alarm function of the vehicle alarm system 100, while at least a second alarm function of the vehicle alarm system 100 is configured to be armed.

In an example with reference to the illustration of FIG. 2, a first interior object O1 is the very rear left seat of the vehicle 1, and a second interior object O2 is the very rear right seat of the vehicle 1. With knowledge of where the seats are installed inside of the vehicle 1, it can be determined where the living objects, in the example two kids 5*c*, 5*d*, are detected and the alarm function in that area of the vehicle 1 can be reduced or unarmed. In the same example, a third interior object O3 is the left back seat, where no living object is detected, and hence an alarm function in the area around where the left back seat is installed can maintained to be armed. Further, in the same example, a dog 5*a* is detected in the vicinity of a fourth interior object O4, the trunk, and e.g. the alarm function detecting opening of the trunk is unarmed.

According to some embodiments the at least first sensor 12*a*, 12*b*, 12*c*, 12*d*, 12*e*, 12*f* is configured to determine the first location of the at least a first living object 5*a*, 5*b*, 5*c*, 5*d* based on at least a first predefined area within a viewfinder.

An advantage with using the viewfinder to determine the location of the living object 5*a*, 5*b*, 5*c*, 5*d* is that the viewfinder can cover a plurality of areas within the vehicle 1, and when detecting a living object 5*a*, 5*b*, 5*c*, 5*d* by the viewfinder it can at the same time be determined where inside of the vehicle 1 the living object 5*a*, 5*b*, 5*c*, 5*d* is located. According some embodiments, the predefined area within the viewfinder can be defined by a vehicle occupant. According to some embodiments, the predefined area within the viewfinder can be defined by the vehicle occupant via a selection input via a user interface 400.

According to some embodiments the reducing, or turning off, the at least first alarm function of the vehicle alarm system 100 is changed dynamically dependent on a movement of the detected at least first living object 5*a*, 5*b*, 5*c*, 5*d* from the first location to a second location other than the first location. According to some embodiments, the detected at least first living object 5*a*, 5*b*, 5*c*, 5*d* is tracked and the reducing, or turning off, the at least first alarm function of the vehicle alarm system 100 is changed dynamically dependent on a predefined distance from the detected at least first living object 5*a*, 5*b*, 5*c*, 5*d* to the at least first alarm function.

An advantage with changing where the vehicle alarm system 100 is armed and where the vehicle alarm system is reduced, or turned off, is that a detected living object 5*a*5*b*, 5*c*, 5*d* can move around inside of the vehicle 1 while continuously maintaining the vehicle 1 armed at locations where the living object 5*a*, 5*b*, 5*c*, 5*d* is not present.

According to some embodiments a plurality of sensors 12*a*, 12*b*, 12*c*, 12*d*, 12*e*, 12*f* are configured to detect the movement of the detected at least first living object 5*a*5*b*, 5*c*, 5*d* from the first location to a second location other than the first location. In an example at least first living object 5*a*, 5*b*, 5*c*, 5*d* is detected by a plurality sensors 12*a*, 12*b*, 12*c*, 12*d*, 12*e*, 12*f* and a transition of the at least first living object 5*a*, 5*b*, 5*c*, 5*d* from the first location to a second location other than the first location can be determined by detection of the at least first living object 5*a*, 5*b*, 5*c*, 5*d* by different sensors 12*a*, 12*b*, 12*c*, 12*d*, 12*e*, 12*f* installed at different locations inside of the vehicle 1.

According to some embodiments the at least first sensor 12*a*, 12*b*, 12*c*, 12*d*, 12*e*, 12*f* is associated with at least a first vehicle compartment space A1, A2, A3, A4, A5, A6 of the vehicle 1, and the processing circuitry 102 is further configured to cause the vehicle alarm system 100 to: detect the at least first living object 5*a*, 5*b*, 5*c*, 5*d* in the at least first vehicle compartment space A1, A2, A3, A4, A5, A6 by the at least first sensor 12*a*, 12*b*, 12*c*, 12*d*, 12*e*, 12*f*; and reduce, or unarm, the at least first alarm function of the vehicle alarm system 100 in the at least first vehicle compartment space A1 A2, A3, A4, A5, A6 where the at least first living object 5*a*, 5*b*, 5*c*, 5*d* is detected in response to detecting the at least first living object 5*a*, 5*b*, 5*c*, 5*d*, while at least a second alarm function of the vehicle alarm system 100 is configured to be armed at a location other than the at least first vehicle compartment space A1, A2, A3, A4, A5, A6.

According to some embodiments, the at least a first vehicle compartment space A1, A2, A3, A4, A5, A6 can be defined by a vehicle occupant. According to some embodiments, the at least a first vehicle compartment space A1 A2, A3, A4, A5, A6 can be defined by a vehicle occupant via a selection input via a user interface 400.

An advantage with associating the at least first sensor 12*a*, 12*b*, 12*c*, 12*d*, 12*e*, 12*f* with at least a first vehicle compartment space A1 A2, A3, A4, A5, A6 of the vehicle 1 is that in one part of the vehicle 1, the vehicle alarm system 100 can be armed, while in another part of the vehicle 1, the vehicle alarm system 100 is reduced, or unarmed, e.g. defined on specific use cases.

Figure 3:
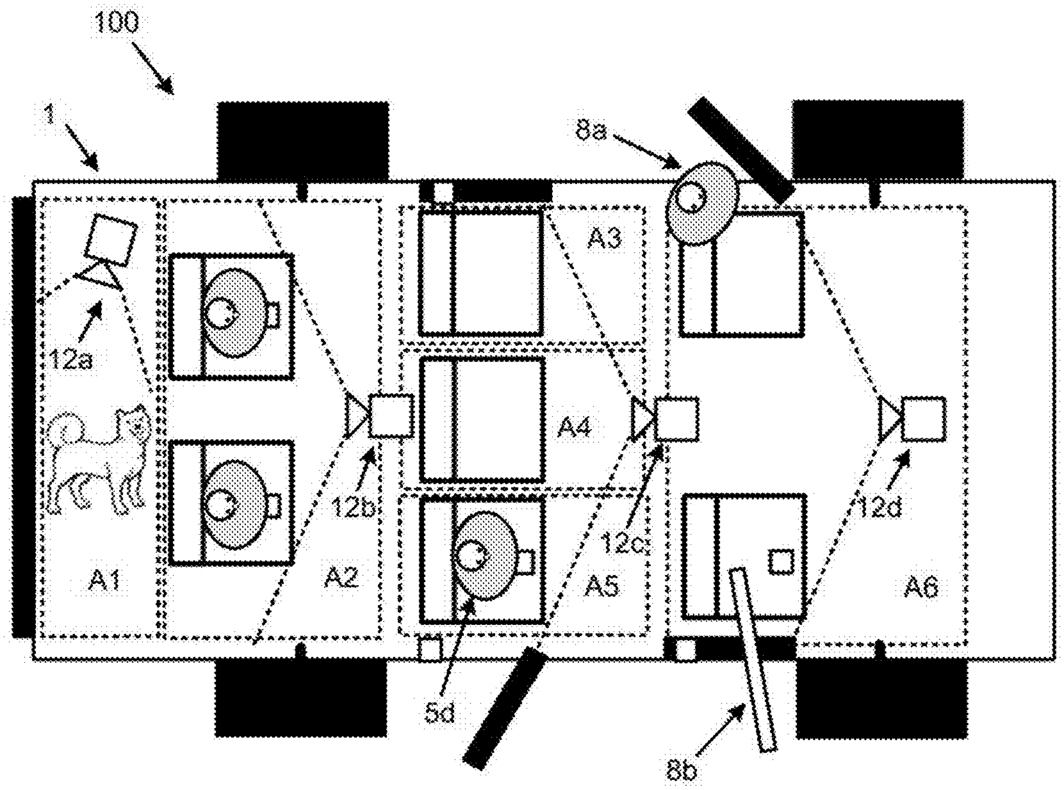
FIG. 3 illustrates the vehicle alarm system with at least a first vehicle compartment space according to some embodiments.

FIG. 3 illustrates the vehicle alarm system 100 with at least a first vehicle compartment space A1 A2, A3, A4, A5, A6 according to some embodiments. In the example as illustrated in FIG. 3 a first vehicle compartment space A1 is the trunk. The sensor 12*a* is a camera that is associated with the vehicle compartment A1 In the example sensor 12*b* is a camera that is associated with the vehicle compartment A2, the second back seat area. Further, the sensor 12*c* is a camera that is associated with the vehicle compartments A3, A4 and A5. In the example, the camera 12*c* is configured to detect the at least first living object 5*a*, 5*b*, 5*c*, 5*d* in a vehicle compartment space that is dependent on where the at least first living object 5*a*, 5*b*, 5*c*, 5*d* is detected in the view finder of the camera 12*c*. In the example, the viewfinder of the camera 12*c* covers the vehicle compartments A3, A4 and A5, and dependent on where in the view finder the living object 5*a*, 5*b*, 5*c*, 5*d* is detected, it is determined in what vehicle compartment A3, A4 or A5 the living object 5*a*, 5*b*, 5*c*, 5*d* is detected. The camera 12*c*, in the example as illustrated in FIG. 3, detects a living object 5*d*, an adult person, in the vehicle compartment A5.

According to some embodiments the at least first vehicle compartment area A1 A2, A3, A4, A5, A6 is defined by a detection coverage area of the at least first sensor 12*a*, 12*b*, 12*c*, 12*d*, 12*e*, 12*f*.

An advantage with using the coverage area of the at least first sensor 12*a*, 12*b*, 12*c*, 12*d*, 12*e*, 12*f* is that the at least first sensor 12*a*, 12*b*, 12*c*, 12*d*, 12*e*, 12*f* can be arranged in the vehicle 1 at a certain location, e.g. when manufacturing the vehicle 1, or when setting up the vehicle alarm system 100, so that the at least first sensor 12*a*, 12*b*, 12*c*, 12*d*, 12*e*, 12*f* covers a certain compartment area A1 A2, A3, A4, A5, A6 of interest in the vehicle 1. In the example as illustrated in FIG. 2, the sensor 12*a* is arranged in the compartment area A1 configured to cover the compartment area A1 in the example the trunk. In the example as illustrated in FIG. 2, the sensor 12*b* is arranged in the compartment area A2 configured to cover the compartment area A2, in the example the second back seat area. Further, the sensor 12*d* is arranged in the compartment area A6 configured to cover the compartment area A6, in the example the front seat area.

According to some embodiments the vehicle alarm system 100 further comprises at least a first alarm sensor 13*a*, 13*b*, 13*c*, 13*d*, 13*e*, 13*f* configured to detect a breach of the vehicle alarm system 100 when the vehicle alarm system 100 is armed, and wherein the reducing, or turning off, the at least a first alarm function of the vehicle alarm system 100 the vehicle comprises reducing, or turning off, at least a first alarm function of the at least first alarm sensor 13*a*, 13*b*, 13*c*, 13*d*, 13*e*, 13*f*.

According to some embodiments, reducing the at least first alarm function comprising changing the sensitivity of the at least first alarm sensor 13*a*, 13*b*, 13*c*, 13*d*, 13*e*, 13*f*. In an example, a first alarm function of the at least first alarm sensor 13*a*, 13*b*, 13*c*, 13*d*, 13*e*, 13*f* is reduced by changing the sensitivity of the at least first alarm sensor 13*a*, 13*b*, 13*c*, 13*d*, 13*e*, 13*f* to detect tilting and movements of the vehicle 1. This can e.g. allow a child or pet to move around inside of the vehicle, to a certain extent, while e.g. if the vehicle 1 is hit by another vehicle, the alarm may be issued since the alarm function is only reduced, not disarmed.

In another example, a first alarm function of the at least first alarm sensor 13*a*, 13*b*, 13*c*, 13*d*, 13*e*, 13*f* is reduced by allowing a predefined time to pass before the at least first alarm sensor 13*a*, 13*b*, 13*c*, 13*d*, 13*e*, 13*f* issues an alarm. For example, a door may be allowed to be opened a certain time, and if the door is closed again within a certain time an alarm will not be issued.

According to some embodiments, reducing the at least first alarm function comprising determining the cause for an alarming event of the at least first alarm sensor 13*a*, 13*b*, 13*c*, 13*d*, 13*e*, 13*f*, before issuing an alarm. In an example alarm sensors 13*a*, 13*b*, 13*c*, 13*d* are configured to detect opening of the doors of the vehicle, e.g. as illustrated in FIG. 2. In the event that an alarm sensor detects the opening of a door, e.g. FIG. 2 illustrates that the alarm sensor 13*c* detects opening of the door 20*c*, the cause for opening the door is determined, and in the example it is further detected that the door 20*c* was opened from the inside of the vehicle 1, and not from the outside of the vehicle 1, and therefore an alarm is not issued due to the reduced alarm function. However, in the same example, if it was detected that the door 20*c* was opened from the outside of the vehicle 1, an alarm would have been issued.

An advantage with an alarm sensor 13*a*, 13*b*, 13*c*, 13*d*, 13*e*, 13*f* is that the alarm sensor 13*a*, 13*b*, 13*c*, 13*d*, 13*e*, 13*f* can be used together with the sensor 12*a*, 12*b*, 12*c*, 12*d*, 12*e*, 12*f* configured to detect at least a first living object 5*a*, 5*b*, 5*c*, 5*d* for detecting any breach of the vehicle alarm system 100. In the example as illustrated in FIG. 3, the vehicle is equipped with alarm sensors in the doors 13*a*, 13*b*, 13*c*, 13*d* and an alarm sensor 13*e* configured to detect if any of the windows of the vehicle is damages, and a further alarm sensor 13*f* configured to detect tilting and movements of the vehicle 1. According to some embodiments the at least first sensor 12*a*, 12*b*, 12*c*, 12*d*, 12*e*, 12*f* configured to detect at least a first living object 5*a*, 5*b*, 5*c*, 5*d* is also configured to function as an alarm sensor 13*a*, 13*b*, 13*c*, 13*d*, 13*e*, 13*f*.

According to some embodiments the at least first sensor 12*a*, 12*b*, 12*c*, 12*d*, 12*e*, 12*f* is configured to detect at least a first living object 5*a*, 5*b*, 5*c*, 5*d* is further configured to function as an alarm sensor 13*a*, 13*b*, 13*c*, 13*d*, 13*e*, 13*f* a predetermined time after the vehicle alarm system has been armed.

According to some embodiments the at least first sensor 12*a*, 12*b*, 12*c*, 12*d*, 12*e*, 12*f* is configured to detect at least a first living object 5*a*, 5*b*, 5*c*, 5*d* and 100 is reduce, or unarm, at least a first alarm function of the vehicle alarm system 100 in response to detecting the at least first living object 5a, 5b, 5c, 5d, while at least a second alarm function of the vehicle alarm system 100 is configured to be armed by the at least first sensor 12a, 12b, 12c, 12d, 12e, 12f.

In an example, the sensor 12a, 12b, 12c, 12d, 12e, 12f detects a first living object 5a, 5b, 5c, 5d and the vehicle alarm system 100 reduces, or unarms, at least a first alarm function of the vehicle alarm system 100 in response to detecting the at least first living object 5a, 5b, 5c, 5d, while at least a second alarm function of the vehicle alarm system 100 is configured to be armed by the at least first sensor 12a, 12b, 12c, 12d, 12e, 12f.

In the example as illustrated in FIG. 3, the vehicle alarm system 100 detects the living objects 5a, the dog, 5b and 5c, the kids, and 5d, the adult person when the vehicle occupant, e.g. the driver locks and arms the vehicle alarm system 100. In the example, after a predetermined time the sensors 12a, 12b, 12c, 12d, 12e, 12f are configured to function as an alarm sensor 13a, 13b, 13c, 13d, 13e, 13f to detect any further living object that e.g. enters the vehicle. In the example as illustrated in FIG. 3, an intruder tries to 8a enter the front seat which causes the vehicle alarm system 100 to issue an alarm. According to some embodiments, the alarm issued by the vehicle alarm system 100 is at least any of a sound e.g. by a siren; a vibration e.g. vibrating a seat where an intruder is detected, or visual alarm e.g. flashing lights of the vehicle. According to some embodiments, the alarm issued by the vehicle alarm system 100 can also be a notification sent to an electronic device via a communications network to alert a person that is distant from the vehicle, e.g. by a notification in a mobile phone.

According to some embodiments the alarm issued by the vehicle alarm system 100, is a signal indicative of the at least first living object detected living object 5a, 5b, 5c, 5d, that is sent to an electronic device via a communications network. According to some embodiments the signal indicative of the at least first living object detected living object 5a, 5b, 5c, 5d, that is sent to the electronic device further comprises a request to issue any of a sound or visual alarm of the vehicle alarm system 100 at the vehicle 1. In the example, the vehicle occupant that has left the vehicle 1 can first get a notification e.g. to the mobile phone with an image of the detected living object 5a, 5b, 5c, 5d, and the vehicle occupant can decide, by responding to the notification if an alarm is to be issued or not by the vehicle alarm system at the vehicle.

According to some embodiments the processing circuitry 102 is further configured to cause the vehicle alarm support system 100 to: detect an object 8a, 8b entering inside of the vehicle 1; and generate an alarm in response to detecting the object 8a, 8b.

This has the advantage that the at least first sensorl2a, 12b, 12c, 12d, 12e, 12f, configured to detect at least a first living object 5a, 5b, 5c, 5d inside of a vehicle 1, can also be configured to detect an object 8a, 8b entering inside of the vehicle, i.e. an object that is not a living object detected inside of the vehicle 1 but e.g. a living object or any object entering inside of the vehicle 1. In the example as illustrated in FIG. 3, an object 8b in form of a pole is entering inside of the vehicle 1 via the passenger seat window. In another example as illustrated in FIG. 3, an intruder 8a tries to enter the front seat via the driver door.

According to some embodiments the at least first sensor 12a, 12b, 12c, 12d, 12e, 12f is configured to detect at least a first living object 5a, 5b, 5c, 5d inside of the vehicle 1 within a predefined time period, and in accordance with a determination that the at least first living object 5a, 5b, 5c, 5d inside of the vehicle 1 is detected after the predefined time period, generate an alarm in response to detecting the object.

This has the advantage that the at least first sensor, configured to detect at least a first living object inside of a vehicle, can also be configured to detect an object inside of the vehicle that was not detected when reducing, or unarming, the at least a first alarm function of the vehicle alarm system 100, e.g. a living object that was e.g. hidden and not initially detected such as an intruder hiding somewhere in inside of the vehicle 1.

Figure 4:
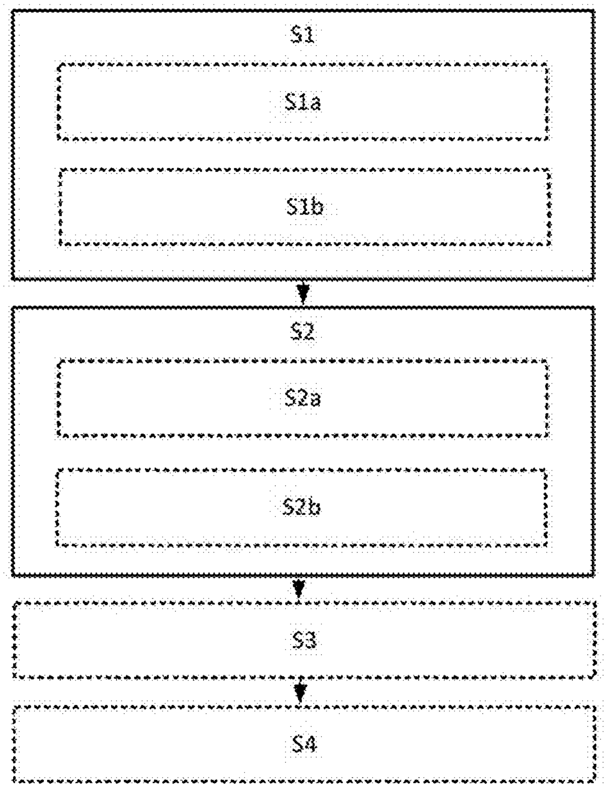
FIG. 4 illustrates a flow chart of the method steps according to the second aspect of the disclosure.
Figure 5:
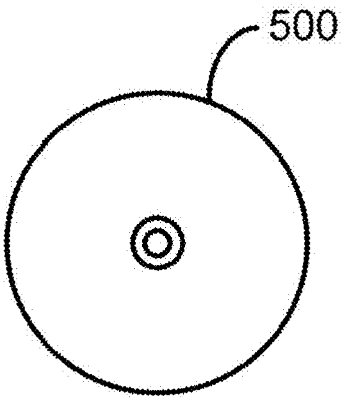
FIG. 5 illustrates a computer program product according to the third aspect of the disclosure.

The second aspect of this disclosure shows a method at a vehicle alarm system 100 for avoiding false alarms while maintaining the vehicle alarm system 100 armed. FIG. 4 illustrates a flow chart of the method steps according to the second aspect of the disclosure. The method comprising: the step S1 detecting at least a first living object 5a, 5b, 5c, 5d inside of a vehicle 1 by at least a first sensor 12a, 12b, 12c, 12d, 12e, 12f; and the step S2 reducing, or unarm, at least a first alarm function of the vehicle alarm system 100 in response to detecting the at least first living object 5a, 5b, 5c, 5d, while at least a second alarm function of the vehicle alarm system 100 is configured to be armed.

An advantage is hence that a vehicle occupant can lock and arm the vehicle, and the vehicle alarm system will automatically detect if a living object is left inside of the vehicle and then reduce or unarm one alarm function while maintaining another alarm function armed.

According to some embodiments the method further comprises: the step S1a determining a first location inside of the vehicle 1 associated with the location where the at least first living object 5a, 5b, 5c, 5d is detected; and the step S2a reducing, or unarming, the at least first alarm function of the vehicle alarm system 100 dependent on the first location in response to detecting the at least first living object 5a, 5b, 5c, 5d, while at least a second alarm function of the vehicle alarm system 100 is configured to be armed at a location other than the determined first location inside of the vehicle 1.

An advantage with detecting the location of the living object is that an alarm function can be reduced or unarmed in the area of the location where the living object is detected while maintaining another alarm function armed.

According to some embodiments the method further comprises: the step S1b detecting the at least first living object 5a, 5b, 5c, 5d in at least a first vehicle compartment space A1 A2, A3, A4, A5, A6 by the at least first sensor 12a, 12b, 12c, 12d, 12e, 12f; and the step S2b reducing, or unarming, the at least first alarm function of the vehicle alarm system 100 in the at least first vehicle compartment space A1 A2, A3, A4, A5, A6 where the at least first living object 5a, 5b, 5c, 5d is detected in response to detecting the at least first living object 5a, 5b, 5c, 5d while at least a second alarm function of the vehicle alarm system 100 is configured to be armed at a location other than the at least first vehicle compartment space A1 A2, A3, A4, A5, A6.

An advantage with associating the at least first sensor with at least a first vehicle compartment space of the vehicle is that in one part of the vehicle, the vehicle alarm system can be armed, while in another part of the vehicle, the vehicle alarm system is reduced, or unarmed, e.g. defined on specific use cases.

According to some embodiments the method further comprises: the step S3 detecting an object 8a, 8b entering inside of the vehicle 1; and the step S4 generating an alarm in response to detecting the object 8a, 8b.

This has the advantage that the at least first sensor, configured to detect at least a first living object inside of a vehicle, can also be configured to detect an object entering inside of the vehicle, i.e. an object that is not a living object detected inside of the vehicle but e.g. a living object or any object entering inside of the vehicle.

The third aspect of this disclosure shows a computer program product the second aspect comprising a non-transitory computer readable medium, having thereon a computer program comprising program instructions, the computer program being loadable into a processing circuitry 102 and configured to cause execution of the method when the computer program is run by the at least one processing circuitry 102.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

What is claimed is:

1. A vehicle alarm system configured to avoid false alarms while maintaining the vehicle alarm system armed, the vehicle alarm system comprises:

a camera positioned in the vehicle to image at least a living object in the vehicle;

a tilt sensor that detects an amount of tilt of the vehicle; and a processing circuitry operatively connected to the camera and configured to detect and characterize the living object in images generated by the camera to identify the living object as belonging to one of a first type of living objects or a second type of living objects, and, wherein the first type of the living object is a human child or an animal and the second type of the living object is a human adult to cause the vehicle alarm system to:

in response to characterizing the living object as belonging to the first type of living objects, reduce or unarm at least a first alarm function of the vehicle alarm system that generates an alarm in accordance with the tilt detector detecting tilt or movement of the vehicle, while at least a second alarm function of the vehicle alarm system that generates an alarm in accordance with detecting intrusion into the vehicle is armed.

2. The vehicle alarm system according to claim 1, wherein the processing circuitry is further configured to determine a location inside the vehicle of the living object; and cause the alarm system to arm the second alarm function at a location other than the determined location inside the vehicle.

3. The vehicle alarm system according to claim 2, further comprising intrusion detection sensors different than the camera, and the processing circuitry causes the vehicle alarm system to reduce or turn off at least one of the intrusion detection sensors located at the determined location of the living object in the vehicle.

4. The vehicle alarm system according to claim 1, wherein the reducing, or turning off, the at least first alarm function of the vehicle alarm system is changed dynamically dependent on detection of movement of the living object from a first location in the vehicle to a second location in the vehicle other than the first location.

5. The vehicle alarm system according to claim 1, wherein the processing circuitry is further configured to cause the vehicle alarm system to: detect an object entering inside of the vehicle; and generate an alarm in response to detecting the entering object.

6. A method of controlling a vehicle alarm system for avoiding false alarms while maintaining the vehicle alarm system armed, the method comprising:

detecting a living object inside of a vehicle from images generated by a camera in the vehicle;

characterizing the living object to identify the living object as belonging to one of a first type of living objects or a second type of living objects; wherein the first type of living objects is a human child or an animal and the second type of the living objects is a human adult and in response to characterizing the living object as belonging to the first type of living objects, reducing or unarming at least a first alarm function of the vehicle alarm system that generates an alarm in accordance with detecting tilt or movement of the vehicle, while at least a second alarm function of the vehicle alarm system that generates an alarm in accordance with detecting intrusion into the vehicle is armed.

7. The method according to claim 6, the method further comprising:

determining a location inside the vehicle of the living object; and causing the alarm system to arm the second alarm function at a location other than the determined location inside the vehicle.

8. The method according to claim 6, the method further comprising:

detecting an object entering inside of the vehicle; and generating an alarm in response to detecting the entering object.

9. A non-transitory computer readable medium having stored thereon a computer program comprising program instructions, the computer program being loadable into a processing circuitry and configured to cause execution of the method according to claim 6 when the computer program is run by the at least one processing circuitry.

* * * * *